United States Patent [19]

Lange

[11] Patent Number: 4,776,721

[45] Date of Patent: Oct. 11, 1988

[54] CONNECTING APPARATUS

[75] Inventor: Fredric A. Lange, Osseo, Minn.

[73] Assignee: Interlock Structures International, Inc., Minneapolis, Minn.

[21] Appl. No.: 946,980

[22] Filed: Dec. 29, 1986

Related U.S. Application Data

[63] Continuation-in-part of Ser. No. 775,597, Sep. 13, 1985, abandoned.

[51] Int. Cl.⁴ ............................................. F16D 1/00
[52] U.S. Cl. ................................. 403/171; 40.3/176; 40.3/338; 40.3/13
[58] Field of Search ............... 403/338, 336, 335, 171, 403/176, 172, 13; 285/407, 406, 365, 364, 398, 371

[56] References Cited

U.S. PATENT DOCUMENTS

| | | | |
|---|---|---|---|
| 1,197,858 | 9/1916 | Redmon | 285/398 X |
| 1,219,183 | 3/1917 | James | 285/398 X |
| 1,679,758 | 8/1928 | Bauersfeld et al. | |
| 1,966,039 | 7/1934 | Muchnic | 285/364 X |
| 2,683,329 | 7/1954 | Kobler | 403/171 X |
| 2,709,094 | 5/1955 | Polanski | 285/407 |
| 3,045,857 | 7/1962 | Lineweber | 285/365 X |
| 3,544,137 | 12/1970 | Contreras et al. | 403/338 X |
| 3,744,577 | 7/1973 | Williams | 403/338 X |
| 4,037,859 | 7/1977 | Clements | 285/364 X |

FOREIGN PATENT DOCUMENTS 1294500  4/1962  France ................. 403/171

Primary Examiner—Andrew V. Kundrat
Attorney, Agent, or Firm—Merchant, Gould, Smith, Edell, Welter & Schmidt

[57] ABSTRACT

The invention is directed to a quick connect/disconnect mechanism for fastening structural members together. The inventive apparatus includes flanges with nonfacing ringular surfaces on each structural member. A bolt or other mechanism aligns the structural members and prevents movement in shear of one with respect to the other. A resilient clip having end portions which are U-shaped in cross section and which extend around more than one-half the circumference of the flanges fits onto the flanges to hold and clamp the structural members together.

20 Claims, 4 Drawing Sheets

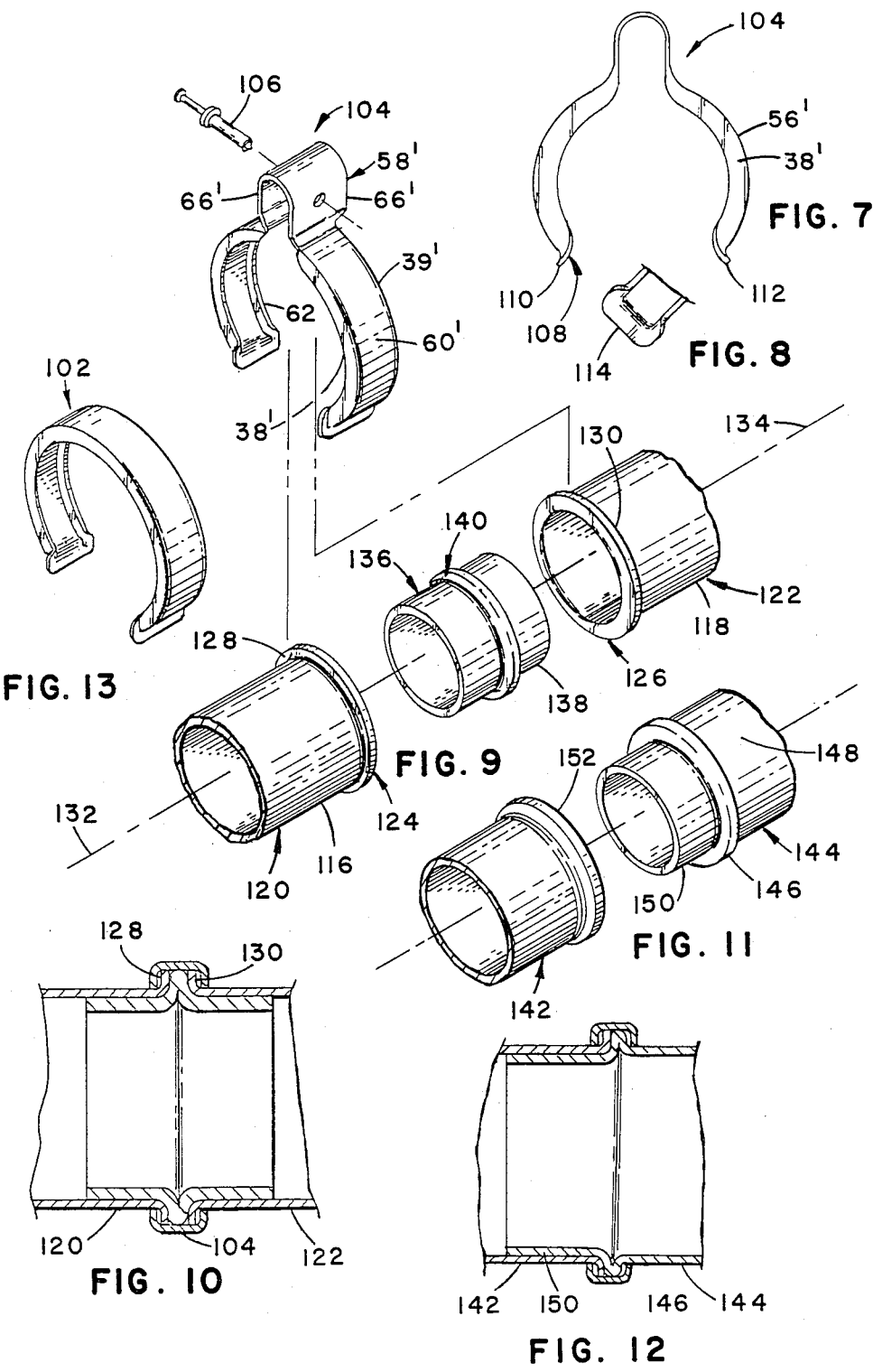

CONNECTING APPARATUS

This is a continuation-in-part of Ser. No. 775,597, filed Sept. 13, 1985 and now abandoned.

FIELD OF THE INVENTION

The present invention is directed to a quick connect/disconnect fastening assembly for a pair of structural members, said fastening assembly being operable without special tools.

BACKGROUND OF THE INVENTION

Space frames, trusses, and similar structural members are known. Usually, truss members are attached to one another or to some other structural member, such as a wall, using nut and bolt combinations. In the case of a space frame, it is common to have a multi-face node with threaded openings in each face for receiving a threaded rod fastened to the end of a tube. Nuts, bolts and various other threaded fastening designs have long been the usual fastening mechanism.

Truss members and space frames are used, not only in a structural sense, but also in a decorative sense. Oftentimes, it is desirable to assemble and thereafter disassemble truss or space frame structures rapidly. Usually, a number of workers must work as a team in order to satisfy such time constraints.

The present invention is intended to replace the necessity for conventional nut and bolt combinations and provide a quick connect/disconnect fastening mechanism for truss members, space frame structures and other structural members so that structures may be rapidly assembled and disassembled without compromising structural strength.

SUMMARY OF THE INVENTION

In this regard, the present invention is directed to interconnect apparatus for fastening first and second structural members together, said structural members including first and second ringular surfaces, respectively, facing generally away from one another. The first and second ringular surfaces are generally aligned by an aligning mechanism along the axes of the structural members, the aligning mechanism also prevents significant radially directed or shear movement. Clamping mechanism contacts the ringular surfaces in the opposing relationship, thereby clamping the structural members together.

More particularly, in the preferred embodiment the ringular surfaces are surfaces facing away from one another on buttons having disk-like heads with shanks which extend into tubular end portions of the first and second structural members. The aligning mechanism preferably includes an axial protrusion on one of the buttons and a mating axial recess on the other. An inexpensive design for achieving such aligning mechanism, while also preventing significant radially directed movement, includes threaded cavities centered on the axis of each button. The end of the cavity is bored to a larger diameter to receive a portion of the head of a bolt. The bolt is then threaded into one of the cavities such that the head of the bolt protrudes beyond the end of the first button into the cavity of the second button.

As indicated, the buttons preferably include circular or disk-like flanges at the ends which are spaced outwardly from the structural members to which they are attached. The clamping mechanism preferably includes a resilient clip having end portions with a U-shape cross section which fit over the pair of abutting flanges and together extend around more than one half the circumference of the flanges thereby clamping and holding the flanges together. A center portion between the end portions is shaped in an inverted U-shape to extend away from the flanges thereby providing a handle for the clip, as well as providing spring-like resiliency for the end portions with respect to the center portion for easy installation and removal of the clip with respect to the flanges.

In an alternate embodiment, the end portion of first and second structural members may be tubular and flared so as to provide ringular surfaces facing away from one another when the flared ends are facing one another. In this situation, the aligning mechanism may be a hollow tubular member having a cylindrical wall and a flange-like portion extending radially outwardly from the wall. The wall of the tubular member fits within the end portions of the first and second structural members, while the flange-like portion fits between the flared ends. The resilient clip as previously described clamps the parts together at the ringular surfaces.

In a further alternative, the aligning mechanism may be a tubular end portion on one of the first or second structural members which end portion has a diameter slightly less than the inside diameter or the end portion of the other of the structural members. In this case, only the latter of the structural members is flared at the end; the former of the structural members is formed to have a flange-like portion extending radially outwardly from the wall of the structural member to provide an element for butting against the flared end of the other structural member. Again, a resilient clip is used to clamp the oppositely facing ringular surfaces of the flared end of the one structural member and the flange-like portion of the other structural member.

It is noted that the resilient clip need not have a center portion. In that case, the clip is usually a permanent installation. Alternatively, a mechanism for rigidifying the center portion has a similar result. A rivet, nut and bolt combination or other fastening mechanism may be passed through the opposite walls of the center portion to hold them at a constant separation thereby limiting the resilience of the clip and making it difficult to remove from a clamping configuration.

A further advantageous feature of the present mechanism is to flare the ends of the resilient clip to minimize what tends to be the weakest region of the clip when the connection is overstressed. That is, the opposite walls of the free ends of the clip are flared outwardly, as is the connecting wall. In this way, a rib is formed at each of the free ends thereby strenghtening the clip in that region.

The present invention is advantageously applicable for each of the tubes of a structural truss. Each tube of each truss has buttons, in the preferred case, attached to it such that one set of buttons includes an aligning bolt while the other set of buttons includes an empty cavity for receiving the head of the bolt. One truss and the buttons attached thereto is thereby aligned with the other truss and the buttons attached thereto so that clips may be installed onto the aligned pairs of buttons. The bolts serve the additional purpose of preventing significant movement in shear of the aligned buttons.

The present invention is of further advantage with respect to a space frame. A node having a plurality of faces includes buttons attached to at least some of the faces. Individual tubes with buttons attached to the ends are aligned, in the fashion previously indicated, with the buttons on the nodes. Clips are installed to hold the tubes to the nodes to form a framework.

The present fastening mechanism is of even further advantage in that a button may be attached directly to a wall or to any of a variety of other structural members. A second button may be attached, for example, to an electronic chassis or some other item which is to be held to the first structural member. When the two buttons are aligned, the clip is installed to provide an easy and quick connect/disconnect fastening mechanism.

It is understood that the preferred and alternate embodiments can be used in similar applications. The embodiments which maintain a hollow passage through the connection may as well be used in applications which require the passage of a wire, a fluid, light or other such material, substance or energy form.

In addition, it is apparent that the method of using the present connecting apparatus is distinguished from the usual threading type fastening mechanism. Rather than requiring tools and a rotation movement, the present apparatus simply requires aligning and an installation of the clip. The present apparatus is, therefore, easy to install, yet the present apparatus has been found to be structurally efficient and strong when made from materials known to those so skilled.

BRIEF DESCRIPTION OF THE DRAWINGS

FIG. 7 is a side view of an alternate embodiment of a clip;

FIG. 8 is a front view of a free end of the clip of FIG. 7;

FIG. 9 is an exploded perspective of an alternate embodiment of the interconnect apparatus of the present invention;

FIG. 10 is a cross-sectional view of the alternate embodiment of FIG. 9;

FIG. 11 is an exploded perspective of a pair of structural members showing yet another alternative embodiment of alignment mechanism;

FIG. 12 is a cross-sectional view of the embodiment of FIG. 11;

FIG. 13 is a perspective view of the clip of FIGS. 7-8, except the central portion is not present.

DETAILED DESCRIPTION OF THE PREFERRED EMBODIMENT

Figure 1:
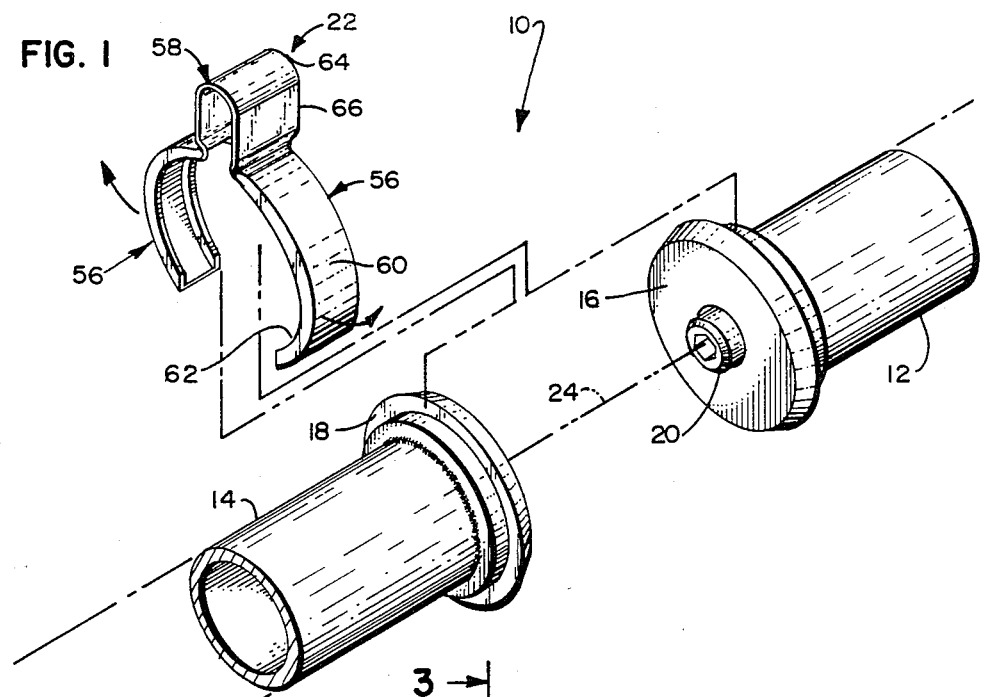
FIG. 1 is a perspective view of the interconnecting apparatus of the present invention relative to first and second tubes.

Referring then to the drawings wherein like reference numerals designate identical or corresponding parts throughout the several views, and wherein like reference numerals, only primed, designate identical or corresponding parts in views of alternate embodiments, and referring more particularly to FIG. 1, interconnecting apparatus in accordance with the present invention is designated generally by the numeral 10. Apparatus 10 is shown relative to first and second structural members 12 and 14 which are shown in the form of cylindrical tubes. Apparatus 10 includes first and second buttons 16 and 18 welded or otherwise attached to the ends of tubular members 12 and 14. Bolt 20 is both a shear pin and provides an alignment mechanism for buttons 16 and 18. Clip 22 holds buttons 16 and 18 together.

Figure 2:
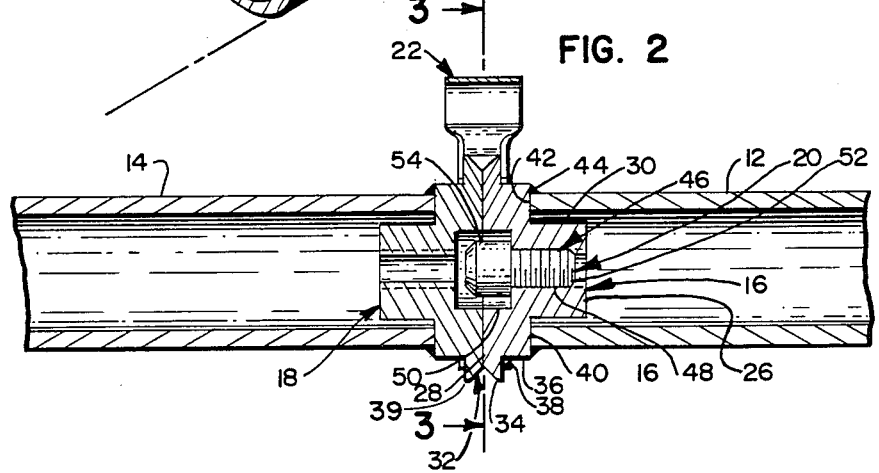
FIG. 2 is an axial cross-sectional view of the apparatus of FIG. 1 when it is connectd together.

As shown more clearly in FIG. 2, both buttons 16 and 18 are preferably identical. The only difference is that a bolt 20 is threaded into one of the buttons, in this case button 16. Consider button 16 as exemplary. Button 16 is symmetric about an axis 24. Button 16 has opposite ends 26 and 28. End 26 faces into tube 12 to which button 16 is attached, while end 28 faces away from tube 12. Button 16 has a cylindrical portion 30 adjacent to face 26. Portion 30 has a diameter so as to just fit within the inner diameter of hollow tube 12. A flange 32 is adjacent to face 28. Flange 32 extends radially beyond the outer diameter of tube 12. Flange 32 has an outer wall 34 slanted inwardly in the direction toward face 28 to form a frusto-conical shape. A stepped portion 36 is formed between the inside wall or ringular surface 38 of flange 32 and portion 30. Step portion 36 provides a wall 40 parallel to face 26 against which end 42 of tube 12 abuts. Portion 36 is cylindrical with a diameter preferably greater than the outer diameter of tube 12 so that a fillet weld 44 may be used between tube 12 and wall 40. If a different type of weld were used or if a different attachment mechanism between button 16 and tube 12 were used, portion 36 would be unnecessary. It is also understood that flange 32 could be the same or of a smaller diameter than portion 30. In that case, flange 32 and portion 30 would be separated by a neck of smaller dimension than flange 32.

An axially aligned cavity 46 is bored into and preferably through button 16. Cavity 46 has a smaller diameter inner portion toward face 26 and a larger diameter outer portion 50 toward face 28. Inner portion 48 is threaded to receive the threaded shank 52 of bolt 20. Outer portion 50 has sufficient diameter to receive head 54 of bolt 20. Outer portion 50 has depth such that some but no more than one half the depth of head 54 protrudes beyond the plane of face 28. In this way, head 54 may extend into the facing outer portion 50 of button 18 to aid in aligning buttons 16 and 18 generally along axis 24 and to prevent movement in shear of buttons 16 and 18 with respect to one another. It is apparent that if buttons 16 and 18 are identical, bolt 20 may be threaded into either button and still serve its aligning and shear pin functions.

As shown most clearly in FIG. 1, clip 22 is a unitary member and includes opposite end portions 56 separated by a center portion 58. Each end portion 56 has a U-shaped cross-section. The U-shaped end portions 56 include a cylindrical connecting wall 60 with radial side walls 62 extending inwardly therefrom. Radial walls 62 are separated by a distance so as to just fit against ringular surfaces 38 and 39 of buttons 16 and 18 when buttons 16 and 18 are abutted against one another. Radial walls 62 extend inwardly so as to approach stepped portions 36, without contacting them. Cylindrical wall 60 has a diameter slightly larger than the greatest diameter of flanges 32 so that end portions 56 fit about and mate with flanges 32. End portions 56 together fit about more than one half the circumference of flanges 32, and preferably fit about approximately three quarters of the circumference of flanges 32.

In this regard, clip 22 has its greatest width along a line passing generally through axis 24, while the free ends of end portions 56 are unconnected and spaced-apart a distance less than the indicated greatest width.

Center portion 58 is U-shaped to extend in an inverted fashion away from end portions 56. That is, the rounded base 64 of center portion 58 is spaced outwardly from end portions 56 while legs 66 extend from base 64 to connect with end portions 56. In this fashion, end portions 56 are separated from one another by approximately the distance of separation of legs 66.

Clip 22 is preferably made from a spring steel. The U-shape of center portion 58 provides a resiliency which allows end portions 56 to separate during installation on and removal from flanges 32. It is noted that clip 58 may be rotated when once installed on flanges 32 so that center portion 58 may extend outwardly at any location around the circumference of flanges 32. In this regard, center portion 58 functions also as a handle to aid in rotating clip 22, as well as to make installation and removal easier.

A center portion, however, is not necessary in all cases as shown in alternate embodiment clip 102 in FIG. 13. Clip 102 is generally used when a connecting installation is permanent, since clip 102 is much less resilient and would be difficult to grasp for removal. Even if a center portion 58' is present, clip 104 as shown in FIG. 9 may be rigified for a more permanent installation by fastening opposite legs 66' with respect to one another. A rivet 106 may be used to hold legs 66' rigid and at a constant spacing. It is also understood that other fastening mechanisms such as nuts and bolt combinations may be used.

As shown in FIGS. 7-9, clip 104 is similar to clip 22 except for the shape of the free ends 108 of end portions 56'. Each free end 108 is flared to provide a rib-like strength and also to aid in installing a clip on flanges 32 or flared ends 124 and 126. More particularly, side walls 62' flare gradually outwardly so that when clip 104 is installed, flared walls 110 near the tip 112 of each free end 108 are approximately perpendicular to partial ring-like surfaces 38' and 39'. Similarly, at free end 108 connecting wall 60' is also gradually flared outwardly to maintain the connecting flared wall 114 between side flared walls 110 (see FIG. 8). Since connecting flared walls 114 are arcuately directed to point at least slightly away from one another, they more easily receive the larger cylindrical shape of flanges 32. In addition, whereas a pair of structural members held together by a clip 22 act as levers and apply significant force on side wall 62 and can rip side wall 62 from connecting wall 60 near the free ends of clip 22, flared walls 110 and 114 form essentially a rib and strengthen a region which may otherwise be somewhat weak.

Alternate embodiments of an alignment mechanism are shown in FIGS. 9-12. In FIG. 9, tubular end portions 116 and 118 of structural members 120 and 122 are shown to have outwardly flared ends 124 and 126. At flared ends 124 and 126, ringular surfaces 128 and 130 facing away from one another are the surfaces which make contact with side walls 62' when clip 104 clamps structural members 120 and 122 together. Preferably, each of surfaces 128 and 130 form angles no greater than 90 degrees with axes 132 and 134, respectively, when viewed in the axial direction away from the other of the ringular surfaces.

The alignment mechanism shown in FIG. 9 is formed with a hollow tubular member 136 having a wall 138 and a flange-like portion 140 which extends radially outwardly from the wall. Flange-like portion 140 is preferably formed as a unitary part of tubular member 136 and extends circumferentially completely around wall 138. Wall 138 has an outer diameter slightly smaller than the inner diameters of structural members 120 and 122 so that tubular member 136 on each side of flange-like portion 140 may readily fit within end portions 116 and 118 as flange-like portion 140 fits between flared ends 124 and 126. In this way, tubular member 136 aligns axis 132 and 134 of structural members 120 and 122 and yet maintains a hollow passageway through which materials, substances, or something other may be directed to pass. Clip 104 fits over and clamps together flared ends 124 and 126 with flange-like portion 140 therebetween.

As shown in FIGS. 11-12, another alternate embodiment of an alignment mechanism essentially forms one end of one of the structural members to incorporate the features of tubular member 136. More particularly, structural member 142 is the same as either of structural members 120 and 122. Structural member 144, however, is cylindrically tubular and has a flange-like portion 146, similar to portion 140, extending radially outwardly from the wall 148 of structural member 144. The tubular end portion 150 on a side of flange-like portion 146 facing structural member 142 is formed to have an outer diameter slightly less than the inner diameter of structural member 142. In this way, end portion 150 fits within structural member 142 and flange-like portion 146 fits against the flared end 152 of structural member 142. It is noted that the side of flange-like portion 146 facing away from structural member 142 forms a ringular surface, while flared end 152 also has a ringular surface facing away from structural member 144. A clip 104 or one of the other clips described is then used to fit about flared end 152 and flange-like portion 146 to contact the respective ringular surfaces to connect or hold structural members 142 and 144 together.

Figure 3:
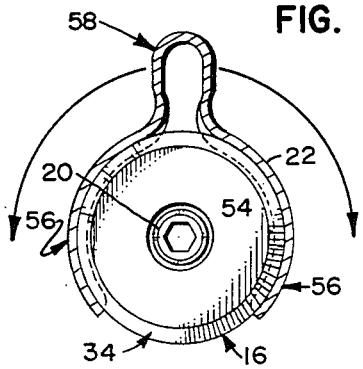
FIG. 3 is a cross-sectional view, taken along line 3—3 of FIG. 2.
Figure 4:
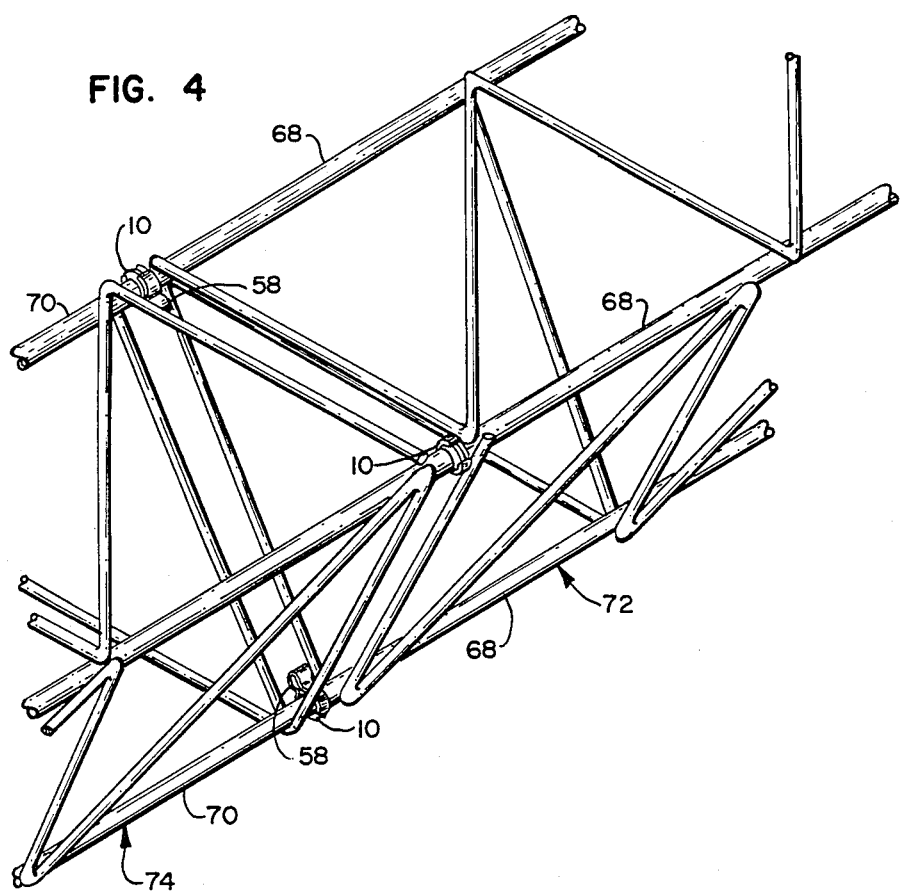
FIG. 4 is a perspective view of a pair of truss members connected together with the apparatus of the present invention.

Apparatus 10 is applicable for fastening a variety of structural members together. First and second tubular members 12 and 14 are shown with respect to apparatus 10 in FIGS. 1-3. Structural members having at least cylindrically tubular ends are shown in FIGS. 9-12. In FIG. 4, an apparatus 10 the same as discussed with respect to FIGS. 1-3 is used to connect each of aligned tubular members 68 and 70 for first and second truss members 72 and 74, respectively. Preferably, all center portions 58 are rotated so as to be directed toward the center of the truss members. Note that bolts 20 are needed in only two of the pairs of buttons to accomplish necessary alignment of the button pairs for the trusses. Bolts 20 are needed in all pairs of buttons, however, to accomplish the shear pin function.

Figure 5:
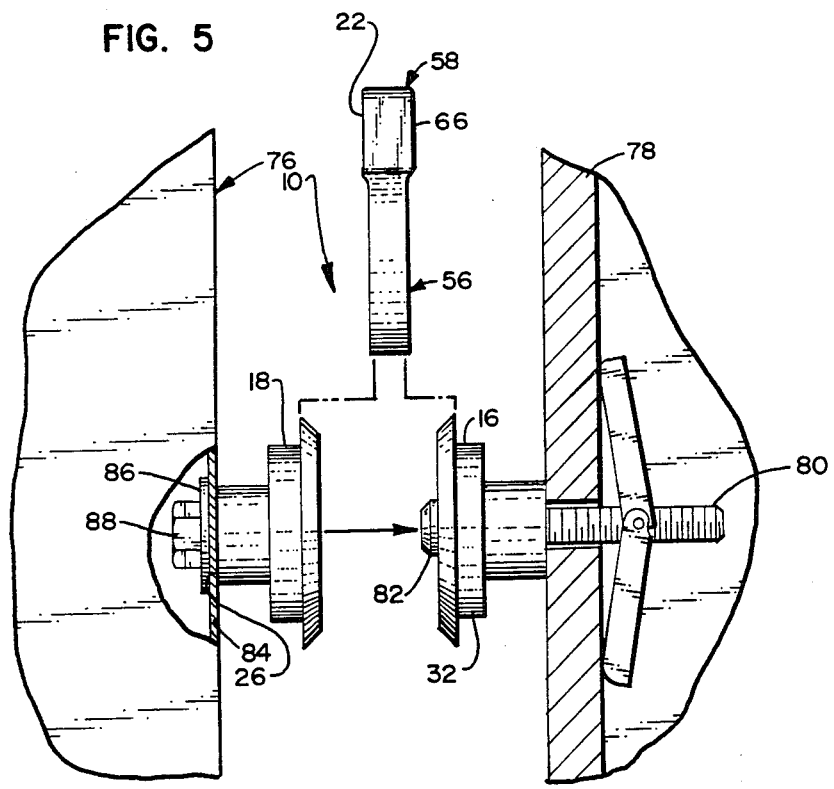
FIG. 5 is an exploded side view, in partial cross section, showing a miscellaneous item connected to a wall.

In FIG. 5, apparatus 10 is shown for fastening an assembly 76 to a wall 78. A conventional toggle bolt 80 is used to fasten button 16 to wall 78. The head 82 of toggle bolt 80 protrudes from button 16 to provide the aligning and shear pin functions as discussed hereinbefore. A second bolt 88 is passed through washer 86 and wall 84 and threaded into button 18 to attach button 18 to assembly 76. With buttons 16 and 18 aligned, clip 22 fits over flanges 32 in the fashion discussed hereinbefore.

Figure 6:
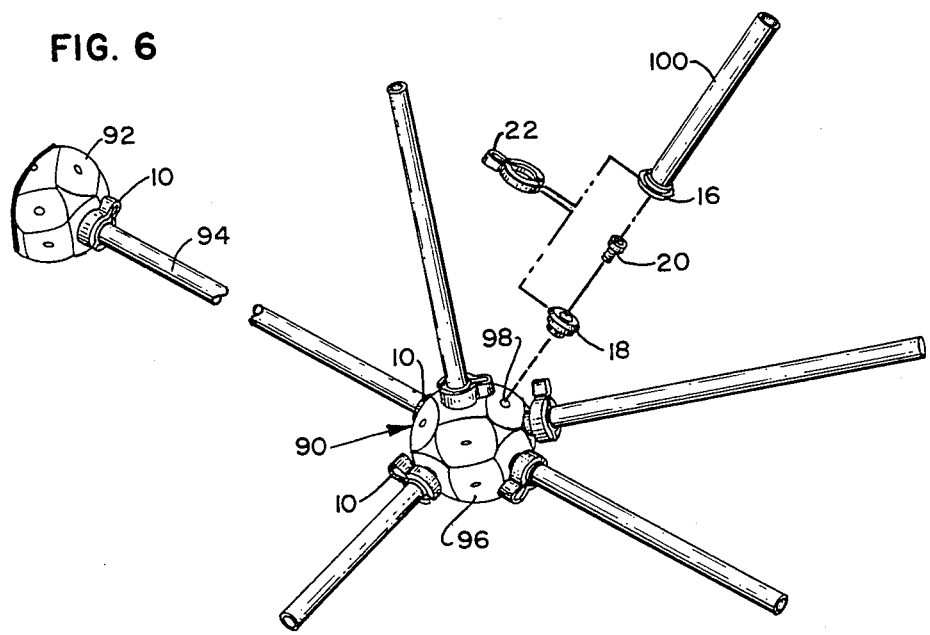
FIG. 6 is a perspective view of a space frame using the connecting apparatus of the present invention.

In FIG. 6, a space frame is shown comprising nodes 90 and 92 fastened together by a tube 94 with an apparatus 10 at either end of tube 94.

Node 90 is exemplary of node 92 and includes a plurality of faces 96. Faces 96 are flat and are perpendicular to radial lines which are equiangularly spaced in each of three orthogonal planes passing through the center of node 90. Other symmetric and asymmetric nodes are also applicable for use with apparatus 10. A threaded opening 98 is bored into the center of each face 96. A button 18 is attached with bolt 20 to each face which is to receive a tube, of which tube 100 is representative. Button 16 is attached in the usual way to the end of tube 100. Tube 100 is aligned as discussed hereinbefore at buttons 16 and 18 and clip 22 is installed. Thus, a plurality of tubes 100 may extend in a variety of directions away from node 90, as also shown in FIG. 6.

Apparatus 10 is preferably used with metallic structural members. In addition, it is preferable for clip 22 to be made from a spring steel. It is understood, however, that the present invention may be made from non-metallic materials. The buttons or other alignment elements may be fastened to or used with the structural members in any acceptable fashion which provides the necessary structural strength. A clip made from a nonmetallic material may be used to hold the buttons or flared ends together as long as the clip is resilient to allow the end portions to separate during installation and removal.

In operation, a bolt 20 is installed in a cavity 46 of a button 16 in the preferred embodiment. Structural members 12 and 14 are then brought together and aligned when the head of bolt 20 is received in the facing cavity 46. A clip 22 is fitted about flanges 32.

In the alternate embodiment of FIG. 9, the structural members 120 and 122 are aligned by inserting tubular member 136 between them so that tubular member 136 is partially received in each of end portions 116 and 118 and so that flange portion 140 fits between flared ends 124 and 126. A clip 104 is then fitted about the flared ends and flange-like portion 140.

Similarly, in the alternate embodiment of FIG. 11, end portion 150 is fitted into the end portion of structural member 142 until flange-like portion 146 contacts flared end 152. A clip 104 is then fitted about flared end 152 and flange-like portion 146.

Even though these details of the structure and function have been set forth with respect to a preferred and alternate embodiments, however, it is understood that other embodiments are encompassed by the present invention. Consequently, size, changes made, especially in matters of shape, size, materials, and arrangement, to the full extent extended by the general meaning of the terms in which the appended claims are expressed, are within the principle of the invention.

What is claimed is:

1. Interconnect apparatus between first and second structural members, comprising:
    first and second buttons each having a circular portion along an outer periphery, said circular portions defining axes;
    first and second means for attaching said first and second buttons to said first and second structural members, respectively;
    means for generally aligning the axes of said first and second buttons with respect to one another and for preventing significant radially directed movement of one of said first and second buttons with respect to the other, said aligning and radial movement preventing means including first and second axial cavities in each of said first and second buttons, one of said first and second cavities including a threaded portion, said aligning and radial movement preventing means further including a bolt threaded into said threaded portion, said bolt having a head protruding beyond said one of said first and second cavities into the other of said first and second cavities; and
    means for clamping said first and second buttons along portions of the outer peripheries of said first and second buttons, said clamping means holding said first and second buttons together in butting relationship;
    whereby said first and second structural members are fastened together.

2. Interconnect apparatus between first and second structural members, comprising:
    first and second buttons each including an end and a flange extending radially beyond said structural members along an outer periphery, said buttons also having cylindrical portions defining axes;
    first and second means for attaching said first and second buttons to said first and second structural members, respectively;
    means for generally aligning the axes of said first and second buttons with respect to one another and for preventing significant radially directed movement of one of said first and second buttons with respect to the other; and
    means for clamping said first and second buttons along portions of the outer peripheries of said first and second buttons, said clamping means including a unified resilient clip having opposite end portions separated by a center portion, said end portions having free ends unconnected with one another and spaced apart, said end portions having a U-shape cross section for fitting onto and clamping together said flanges, said center portion being U-shaped for resiliency and extending away from said flanges, said clamping means holding said first and second buttons together in butting relationship;
    whereby said first and second structural members are fastened together.

3. Interconnect apparatus for fastening first and second cylindrical tubes together, said apparatus comprising:
    first and second buttons, each of said buttons including a disk-like radial flange, each of said buttons further including an axial cavity having a threaded inner portion with a smaller diameter and an outer portion with a larger diameter;
    first and second means for attaching said first and second buttons to said first and second tubes, respectively;
    a bolt having a shank and a head, said shank being threaded into one of said threaded inner portions of one of said cavities in one of said first and second buttons, said head extending beyond the end of said one of said first and second buttons and into the larger diameter outer portion of the cavity of the other of said first and second buttons, said bolt serving to align said buttons with respect to one another; and
    a resilient clip having opposite end portions separated by a center portion, said end portions having a U-shape cross section for fitting onto and clamping together said flanges, said center portion being U-shaped and extending in an inverted fashion away from said end portions;

whereby said bolt generally aligns and prevents said first and second buttons from moving significantly in shear with respect to one another and said clip includes said end portions which fit onto the flanges of said aligned buttons to connect said structural members together.

4. Interconnect apparatus for fastening first and second truss members together, each of said truss members including a plurality of interconnected spaced apart tubular members, said interconnect apparatus comprising:

a plurality of buttons to include one for each tubular member of each of said first and second truss members, said buttons being axially symmetric and having disk-like flanges;

means for attaching one of said buttons to an end of each of said tubes of said first and second truss members;

means for aligning each of said buttons on said first truss member with a different one of said buttons on said second truss member to form pairs of aligned buttons, said aligning means including means for preventing significant movement in shear of one of said aligned buttons with respect to the other of each of said pairs; and means for clamping each of said aligned buttons together, said clamping means including a unified resilient clip having opposite end portions separated by a center portion, said end portions having free ends unconnected with one another and spaced apart, said end portions having a U-shape cross-section for fitting onto and clamping together said flanges, said center portion being U-shaped for resiliency and extending away from said end portions.

5. Apparatus in accordance with claim 4 wherein said movement in shear preventing means includes an axial cavity in each of said buttons, one of said cavities in each of said pairs of aligned buttons including a threaded portion, said movement in shear preventing means further including a bolt for each of said pair of aligned buttons threaded into said threaded portion, each of said bolts having a head protruding beyond said one of said cavities into the other of said cavities of each of said pairs of aligned buttons to prevent significant movement in shear between said buttons of each of said pair of aligned buttons.

6. Interconnect apparatus for a space frame, comprising:

a plurality of tubes having first ends;
a plurality of buttons, each of said buttons including a flange;
first means for attaching one of said buttons to each of the first ends of said tubes, said flanges being spaced outwardly from the first ends;
a node with a plurality of faces;
second means for attaching at least one of said buttons to a different one of said plurality of faces of said node, said flanges of said buttons being spaced outwardly from said faces;
means for aligning each of said buttons on said tubes with a different one of said buttons on said node to form pairs of aligned buttons, said aligning means preventing significant movement in shear of one of said aligned buttons with respect to the other of each of said pairs; and means for clamping each of said aligned buttons together, said clamping means fitting about portions of said flanges of said aligned buttons.

7. Apparatus in accordance with claim 6 wherein said aligning means includes an axial protrusion on one of said buttons of each of said pairs and a mating axial recess for receiving said protrusion in the other of said buttons of each of said pairs.

8. Apparatus in accordance with claim 6 wherein each of said buttons includes a smaller diameter cylindrical portion and a circular flange extending radially beyond said smaller diameter cylindrical portion, said flanges of each of said pairs of aligned buttons being adjacent to one another, and wherein said clamping means includes a resilient clip having portions with a U-shape cross section for fitting onto said adjacent flanges in an axial direction, said U-shape portions extending around more than one half the circumference of said adjacent flanges in a circumferential direction.

9. Interconnect apparatus for a space frame, comprising:

a tube having first and second ends;
a plurality of buttons, each of said buttons including a flange;
first means for attaching one of said buttons to each of the first and second ends of said tube so that said flanges are spaced outwardly from the first and second ends;
a pair of nodes, each of said nodes having a plurality of faces;
second means for attaching one of said buttons to one of said faces of each of said nodes so that said flanges are spaced outwardly from said faces;
means for aligning said buttons on the first and second ends of said tube with said buttons on said nodes to form pairs of aligned buttons, said aligning means preventing significant movement in shear of one of said aligned buttons with respect to the other of each of said pairs; and
means for clamping each of said aligned buttons together, said clamping means fitting about portions of said flanges of said aligned buttons.

10. Apparatus in accordance with claim 9 wherein said aligning means includes an axial protrusion on one of said buttons of each of said pairs and a mating axial recess for receiving said protrusion in the other of said buttons of each of said pairs.

11. Apparatus in accordance with claim 9 wherein each of said buttons includes a smaller diameter cylindrical portion and a circular flange extending radially beyond said smaller diameter cylindrical portion, said flanges of each of said pairs of aligned buttons being adjacent to one another, and wherein said clamping means includes a resilient clip having portions with a U-shape cross section for fitting onto said adjacent flanges in an axial direction, said U-shape portions extending around more than one half the circumference of said adjacent flanges in a circumferential direction.

12. A method for interconnecting adjacent ends of a first structural member to a second structural member, said method comprising the steps of:

installing a bolt in a first axial cavity of one of a pair of buttons, each button of said pair being attached to a different end of said adjacent ends of said first and second structural members, said first axial cavity having a threaded portion for receiving said bolt, said bolt having a head protruding from said first axial cavity, the other of said pair of buttons having a second axial cavity;

aligning said button attached to said first structural member with said button attached to said second structural member by fitting the head of said bolt protruding from said first axial cavity into said second axial cavity, each of said buttons having a circular flange; and installing a resilient clip about at least a portion of said flanges of said aligned buttons.

13. Interconnect apparatus, comprising:

first and second structural members having first and second end portions, respectively, said first and second structural members having first and second axes, respectively, said first and second end portions including first and second ringular surfaces, respectively, said first and second ringular surfaces facing generally away from one another, each of said first and second ringular surfaces forming angles no greater than 90 degrees with said first and second axes, respectively, in the axial direction away from the other of the ringular surfaces;

rigid means for generally aligning the axes of said first and second structural members with respect to one another and for preventing significant radially directed movement of one of said first and second structural members with respect to the other;

means for clamping said first and second structural members together, said clamping means being formed as a unitary member having a generally U-shaped cross section with first and second walls on opposite sides for contacting said first and second ringular surfaces, respectively, said first and second walls having oppositely facing first and second ring-like surfaces, respectively, said unitary member having a greatest width along a line passing generally through the alignd axes and having free ends unconnected from one another and spaced-apart a distance less than said greatest width when said unitary member clamps said first and second structural members together.

14. The apparatus in accordance with claim 13 wherein said unitary member includes end portions terminating at one end with said free ends and at another end with a center portion, said center portion being U-shaped for resiliency and extending away from said ringular surfaces and said end portions, said apparatus further including means for making said resilient center portion rigid.

15. The apparatus in accordance with claim 14 wherein said rigid making means includes a rivet.

16. The apparatus in accordance with claim 13 wherein said first and second walls of said unitary member include sections near said free ends which are flared outwardly from said first and second ring-like surfaces, said unitary member having a connecting wall between said first and second walls of said U-shaped cross section, said connecting wall also being flared near said free ends, whereby said flared sections strengthen said unitary member at the free ends of said unitary member.

17. The apparatus in accordance with claim 13 wherein said first and second end portions of said first and second structural members are tubular having first inner diameters, said first and second end portions having first and second flared ends, respectively, and wherein said aligning means includes a hollow tubular rigid member having a wall and a flange-like portion extending radially outwardly from said wall, said wall having a second outer diameter slightly smaller than the first inner diameters of said first and second structural members, said wall of said tubular member fitting within said first and second tubular end portions of said first and second structural members with said flange-like portion fitting between said first and second flared ends.

18. The apparatus in accordance with claim 17 wherein said first and second structural members are hollow and are each one of a plurality of interconnected spaced-apart tubular members of first and second truss members, respectively.

19. The apparatus in accordance with claim 17 wherein said first structural member is a node of a space frame, said node being hollow and having a plurality of faces, said first end portion extending away from one of said faces, said second structural member also being hollow.

20. The apparatus in accordance with claim 17 wherein said first and second structural members are both hollow tubes.

* * * * *